United States Patent [19]

Miller et al.

[11] Patent Number: 5,941,338
[45] Date of Patent: Aug. 24, 1999

[54] VEHICLE STEERING CORRECTION SYSTEM

[75] Inventors: Gerald Roger Miller, Gray Court; Jack Latrop Wilson, Jr., Greenville; James Kenneth Clinkscales, Easley, all of S.C.

[73] Assignee: Michelin Recherche et Technique S.A., Switzerland

[21] Appl. No.: 08/722,381

[22] Filed: Sep. 30, 1996

Related U.S. Application Data

[60] Provisional application No. 60/023,652, Aug. 1, 1996.

[51] Int. Cl.⁶ .................................................. B62D 5/06
[52] U.S. Cl. ........................ 180/421; 180/442; 280/268; 701/41
[58] Field of Search ................................... 180/421, 442, 180/422, 441; 280/268; 701/41, 42; 60/420

[56] References Cited

U.S. PATENT DOCUMENTS

| | | | |
|---|---|---|---|
| 4,410,193 | 10/1983 | Howard | 280/90 |
| 4,534,577 | 8/1985 | Howard | 280/90 |
| 4,756,427 | 7/1988 | Yonker | 180/143 |
| 4,877,100 | 10/1989 | Emori et al. | 180/143 |
| 4,941,097 | 7/1990 | Karnopp et al. | 364/424.05 |
| 5,048,630 | 9/1991 | Schaffer | 180/422 |
| 5,156,229 | 10/1992 | Yasui et al. | 180/140 |
| 5,267,627 | 12/1993 | Frank et al. | 180/132 |
| 5,267,628 | 12/1993 | Tomiyoshi et al. | 180/139 |
| 5,291,962 | 3/1994 | Momiyama et al. | 180/421 |
| 5,303,636 | 4/1994 | Stephenson et al. | 180/422 |
| 5,313,389 | 5/1994 | Yasui et al. | 364/424.05 |
| 5,373,911 | 12/1994 | Yasui | 180/168 |
| 5,422,810 | 6/1995 | Brunning et al. | 180/421 |
| 5,511,630 | 4/1996 | Kohata et al. | 180/142 |
| 5,527,053 | 6/1996 | Howard | 280/90 |
| 5,536,028 | 7/1996 | Howard | 280/90 |

FOREIGN PATENT DOCUMENTS

| | | | |
|---|---|---|---|
| 0 480 801 | 4/1992 | European Pat. Off. | B62D 5/06 |
| 2 294 669 | 5/1996 | United Kingdom | B62D 5/09 |

*Primary Examiner*—Daniel G. DePumpo
*Attorney, Agent, or Firm*—Alan A. Csontos; Robert R. Reed

[57] ABSTRACT

The correction system of this invention simulates a power steering leak which the driver can manually adjust or automatically tune to offset vehicle drift and/or pull generated by road crown, wind, vehicle alignment, and tires during straight ahead driving. The drift and pull correction system taps into the bypass line of a vehicle's power steering system and can be added to the vehicle as an aftermarket device. For example, the standard rack or power gear, the power steering pump and reservoir and the steering assembly of the power steering system can be used in combination with the addition of correction lines and correction valves of the steering correction system to correct the vehicle's steering system for "straight ahead driving" without operator assistance. The magnitude of the drift and/or pull is a direct function of the magnitude of the leak and the back (parasitic) pressure in the system. The correction system bypasses hydraulic fluid to one side of the power steering piston causing the steering system to input a steer angle change to the wheels until the added steering force generated on the vehicle is adequate to balance the forces and moments generated during straight ahead driving.

16 Claims, 5 Drawing Sheets

VEHICLE STEERING CORRECTION SYSTEM

This application claims the benefit of U.S. Provisional Application No. 60/023,652 filed Aug. 1, 1996.

BACKGROUND

The present invention involves the steering systems for vehicles, and more particularly to a steering pull and drift correction system for compensating a vehicle during straight ahead driving.

A vehicle under normal driving conditions can have a drift or pull to one side or the other generated by road crown, wind, alignment, tires and the like. This drift requires a steady adjustment in the steering wheel angle to compensate for this pull and drift to make the vehicle travel straight ahead. This steering wheel adjustment activates the steering system of the vehicle to add a steering force to cancel the pull and drift that makes the vehicle deviate from going straight ahead.

Various types of steering mechanisms have been developed for motor vehicles and the like. Commonly used mechanisms have a hydraulic power source driven by the vehicle's engine. A hydraulic power steering system is an open center system including a pump and reservoir, a flow control valve, a pressure relief valve, a steering control valve and a movable piston inside a power steering cylinder. A hydraulic power steering system utilizes a hydraulically activated piston within the power steering cylinder which is associated with the movement of a rack element of a rack and pinion steering assembly connected to the steerable wheels of the vehicle. Fluid is continually circulated by the pump to the control valve supplying the cylinder before being returned to reservoir portion of the pump and reservoir. When steering assist is required, the driver turns the steering wheel and the power steering control valve diverts fluid to the proper side of the piston. This diversion drives the piston and forces the power steering assembly to turn the wheels of the vehicle; whereby a steering or turning force on the vehicle is produced by way of lateral forces on the tires.

In the patent of Howard (U.S. Pat. No. 4,410,193) an additional cylinder or cylinders are used to accomplish the return of the steering system to a predetermined center position. Howard uses an additional trim cylinder to fine tune the center position of the steering system. Howard discloses other mechanical compensator devices for centering the steering system and returning to a center position in U.S. Pat. Nos. 4,534,577; 5,527,053; and 5,536,028. These devices are concerned with maintaining a center steering position without slack until a steering force from the steering wheel exceeds a preselected value. In U.S. Pat. No. 5,536,028 a trimming unit is provided for varying the center position, including trim chambers on opposite sides of a trim piston. These mechanical components are added to the hydraulic power steering system as well as to tie rods of the vehicle's steering system.

The patents of Yonker (U.S. Pat. No. 4,765,427), Emori et al (U.S. Pat. No. 4,877,100) and Kohata et al (U.S. Pat. No. 5,511,630), all disclose modifications in the power steering gear and housing before it meshes with a rack. In U.S. Pat. No. 5,511,630 the an auxiliary pump system provides stable operation or a power steering system which automatically corrects unexpected variations in the path of a vehicle. The system includes inner and outer sleeves and a torsion bar coupled to the inner sleeve and a piston shaft. A torque motor rotates the torsion bar to provide relative motion between inner and outer sleeves to switch oil passages in a rotary valve which communicate with a power cylinder during unexpected vehicle path variations. The standard steering system is modified by the addition of the torque motor requiring replacement of standard steering components.

The traveled path of the vehicle can be monitored and the steering forces to maintain a desired vehicle trajectory can be controlled. The patent of Frank (U.S. Pat. No. 5,267,627) discloses a power steering controller which monitors vehicle speed and the torque on the steering shaft. A stability augmentation system including an electric motor is responsive to a command signal generated by the power steering controller. The system includes a hydraulic system having a separate oil pump and valve arrangement along with the electric motor controlling the flow of hydraulic fluid to the power steering cylinder. The system is inoperative over a zone based on vehicle speed and output torque of the steering shaft.

The patents of Yasui et al (U.S. Pat. No. 4,941,079 and U.S. Pat. No. 5,313,389) disclose a solenoid valve controller or driver which is directed by a computer using yaw rate, speed and steering wheel angle data from vehicle sensors. Valves are opened or closed to drive a separate added piston inside another cylinder that moves a steering rod of the steering control mechanism. Steering system movements relative to the vehicle are provided in addition to nominal lateral movement provided by the steering mechanism. The steering apparatus and control system provides adaptive control for the moving vehicle to substantially conform the yaw rate of the vehicle to the desired yaw rate. The system maintains vehicle stability as the steerable wheels are independently steered in response to the controller output signal. In a further patent of Yausi et al (U.S. Pat. No. 5,156,229) additional drive components including fluid filled cylinders, housings and electric motors are added to the steering apparatus. These components help to correct the steer angle of the vehicle wheels using controller signals generated from vehicle sensors including vehicle yaw rate sensors.

The need exists to find an economical system for adjusting the steering system of a vehicle to compensate for straight ahead drift without the addition of complex mechanical or electrical components or auxiliary systems. It is known that an internal leak in a power steering system control valve provides a slight vehicle pull forcing the vehicle to drift to one side or the other. This slight force has been found to be adequate to correct for the drift and pull during straight ahead driving.

To overcome the complexity of systems described, one object of the present invention is to find a cost effective means to incorporate a leak in the steering system that can be controlled manually or automatically to correct for a steering pull as needed.

Another object of the present invention is to provide a simple drift control apparatus and for existing vehicles that can easily be adapted to existing hydraulic power steering systems.

SUMMARY OF THE INVENTION

The present invention provides the means to introduce a controlled leak in the power steering system to provide a lateral force on a vehicle to overcome the natural tendency of the vehicle to pull and/or drift during normal straight ahead driving of the vehicle.

The magnitude of the pull is a direct function of the leak magnitude and the back (parasitic) pressure in the system. The leak bypasses hydraulic fluid to one side of the power steering piston causing the steering system to input a steer angle change to the wheels until the added steering force generated on the vehicle is adequate to balance the forces and moments generated by the suspension, steering system, tires, vehicle alignment, road crown, wind and the like during straight ahead driving.

A priority flow control valve along with a system valve, a modulating valve and a plurality of correction valves and correction lines are added to the power steering system for diverting hydraulic fluid within the power steering system. The modulating valve, the system valve and the correction valves can be manually or automatically operated.

In one embodiment of the present invention, a steering correction system is provided for a power steering system of a vehicle for assisting an operator in controlling straight ahead travel of the vehicle. The power steering system has a hydraulic pump and reservoir, a pressure relief valve and a plurality of main lines for supplying and returning a hydraulic fluid to a power steering assembly mounted on a frame of the vehicle. The steering assembly provides steering forces for wheels of the vehicle. The correction system comprises a plurality of correction lines connected to a main bypass line of the power steering system for diverting and selectively routing a portion of the hydraulic fluid within the power steering system to the steering assembly. The system further comprises a priority valve for receiving the fluid portion from the bypass line and dividing the fluid portion to provide flow into a correction supply line and a correction bypass line of the plurality of correction lines. A system valve is positioned in a first line between the correction supply line and a correction return line and is normally open for routing a first part of the fluid portion to flow from the correction supply line into a correction return line of the plurality of correction lines. A modulating valve is positioned in a second line between the correction supply line and the correction return line for routing an adjustable second part of the fluid portion to the correction return line from the correction supply line. A pair of correction valves are each located in a trim line connected to the correction supply line for routing a third part of the fluid portion through a respective trim line of the plurality of correction lines to the steering assembly when the correction valves are activated, the system valve is closed and the modulating valve is adjusted. Finally, the system comprises a logic controller and a switch mechanism for operating and activating each one of the valves to provide a relative magnitude of the second and third parts of the fluid portion. Therefore, the wheels are rotated for adjusting the steering forces on the vehicle and operator supplied steering forces are reduced during straight ahead driving of the vehicle.

In another embodiment of the invention, a steering correction system in combination with a motor vehicle's power steering system is provided for correcting steering drift and pull on the vehicle, so that the vehicle travels a straight ahead path without operator assistance. The vehicle has a power steering system associated with at least one steerable wheel which is displaced to apply a lateral force on the vehicle. The system comprises a steering assembly of the power steering system of the vehicle for displacing the at least one steerable wheel. A hydraulic pump and reservoir of the power steering system of the vehicle is for supplying and returning a steering fluid through a plurality of main lines to the steering assembly. The main lines of the power steering system include a main bypass line. A plurality of correction lines are connected between the bypass line and the steering assembly for selectively routing a portion of the steering fluid within the steering system without the need for additional fluids added to the power steering system. A plurality of valves are selectively located in the correction lines for providing the routing without the use of other mechanical components added to the power steering system. A logic controller and a switch mechanism is for electrically operating the plurality of valves based on a desired steering correction to the steering pull. The steering pull and drift is compensated without continuous steering inputs by the operator.

In yet another embodiment of the invention, an improved method is provided for correcting a drift and pull on a vehicle having a power steering system. The power steering system includes a hydraulic pump and reservoir for supplying a steering assembly with a power steering fluid through a plurality of main lines. The method includes a first steps of cutting a main bypass line of the plurality of main lines for rerouting a portion of the steering fluid. A second step includes providing a plurality of steering correction system lines connected to the main bypass line for selectively diverting at least part of the fluid portion to the steering assembly. In a third step, the method includes providing a plurality of steering correction system valves located in the plurality of correction lines. A fourth step includes selectively routing the fluid portion so that a first part of the fluid portion may be returned to the hydraulic pump through a system valve of the plurality of correction valves, a second part of the fluid portion may be returned to the hydraulic pump through a modulating valve of the plurality of correction valves and a third part of the fluid portion may be diverted to the steering assembly. A fifth and final step includes controlling the relative first, second and third parts of the fluid portion by using a logic controller and a switch mechanism for selectively opening and closing the plurality of correction valves to correct for right and left drift and pull on the vehicle for straight ahead driving.

BRIEF DESCRIPTION OF THE DRAWINGS

The objects and advantages of the invention will become more readily apparent from the following detailed description of the preferred embodiments thereof in connection with the accompanying drawings in which.

DETAILED DESCRIPTION OF THE PREFERRED EMBODIMENTS

The system of this invention simulates a power steering leak which the driver can manually adjust or is automatically tuned to offset vehicle drift and/or pull generated by road crown, wind, vehicle alignment, and tires during straight ahead driving. The drift and pull control system taps into the lines of a vehicle's power steering system and can be added to the vehicle as an aftermarket device. The system of the present invention does not require additional power steering cylinders, mechanical arms or electrical motors as it makes use of the existing power steering systems. For example, the rack or power gear as a steering assembly and the existing power steering pump and reservoir as a hydraulic fluid power source along with the relief valve can be used. The references disclose additional means, being added sensors, cylinders and electrical motors, for example, to establish the steering location and correct the system for "straight ahead driving" against pull and drift. The present invention uses the balance of forces in the steering system to determine "straight ahead", as determined by the driver or an automatic torque and\or angle averaging device.

In the present invention the vehicle is made to travel straight ahead without the need for providing a steering torque or for turning the steering wheel. The drift and pull control system requires much smaller steering forces than those necessary for turning the vehicle during cornering and like. Therefore, the excess power capability of the standard power steering system of the vehicle during straight ahead driving is adequate for providing the fluid power necessary for the drift control system of this invention, as further defined in this description.

Figure 1:
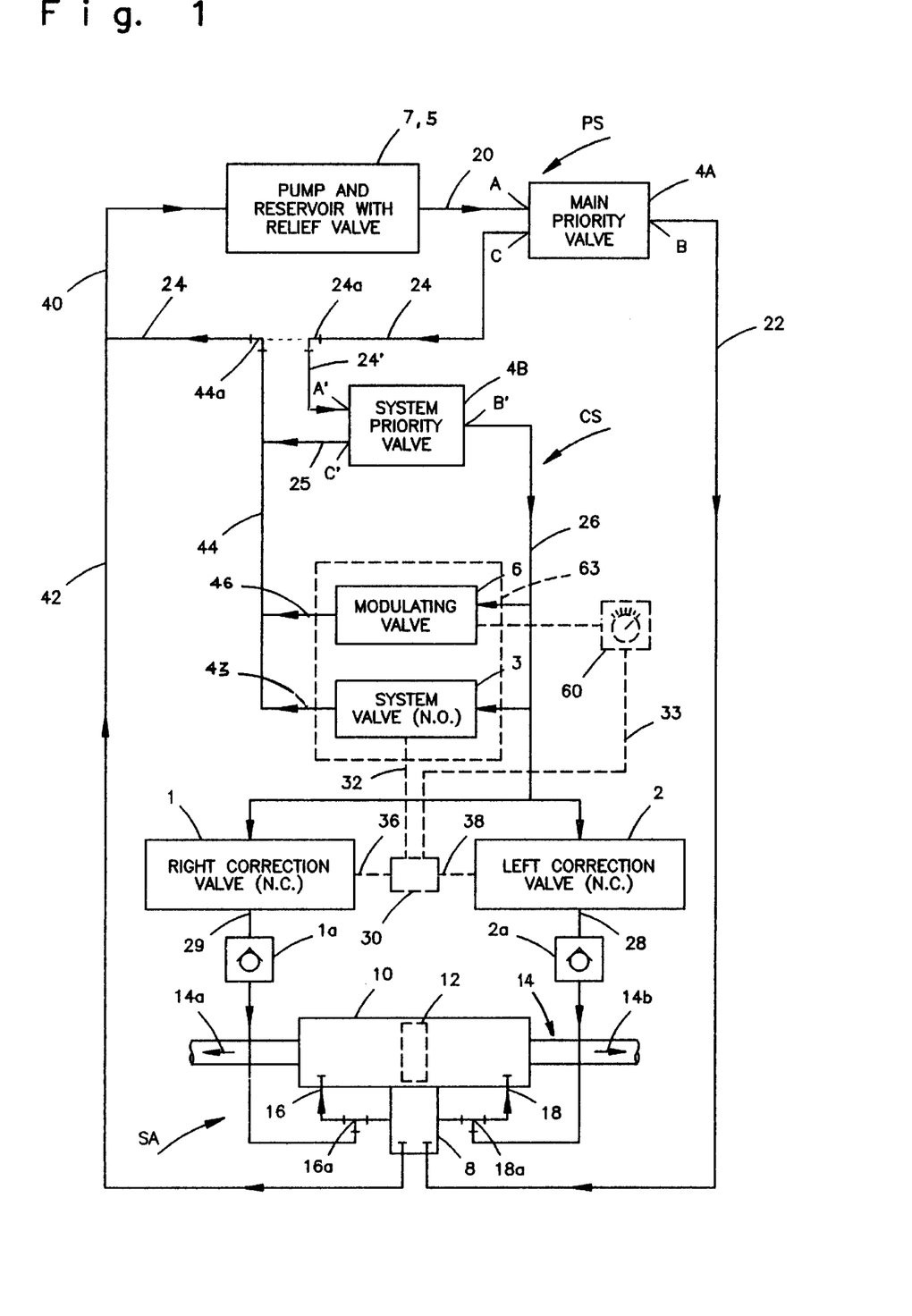
FIG. 1 is a flow diagram illustrating the interconnected components of a vehicle's power steering system with the steering correction system of this invention.

The drift control system of this invention is added to a vehicle's existing power steering system, as illustrated in FIG. 1. The commonly used power steering system PS of a vehicle includes a pump and reservoir 7 with a pressure relief valve 5. The reservoir contains a power steering fluid and the pump is powered by a motor of the vehicle. The greater the rotational speed of the vehicle's motor, in revolutions per minute (rpm), the more fluid the pump circulates throughout the system per unit of time. The pump supplies power steering fluid to an inlet port A of a main priority valve 4A through a pump output line 20. The main priority valve discharges fluid through a discharge port B into a main supply line 22 connected to a power steering control valve 8, which is one component a steering assembly SA of the vehicle.

Figure 2:
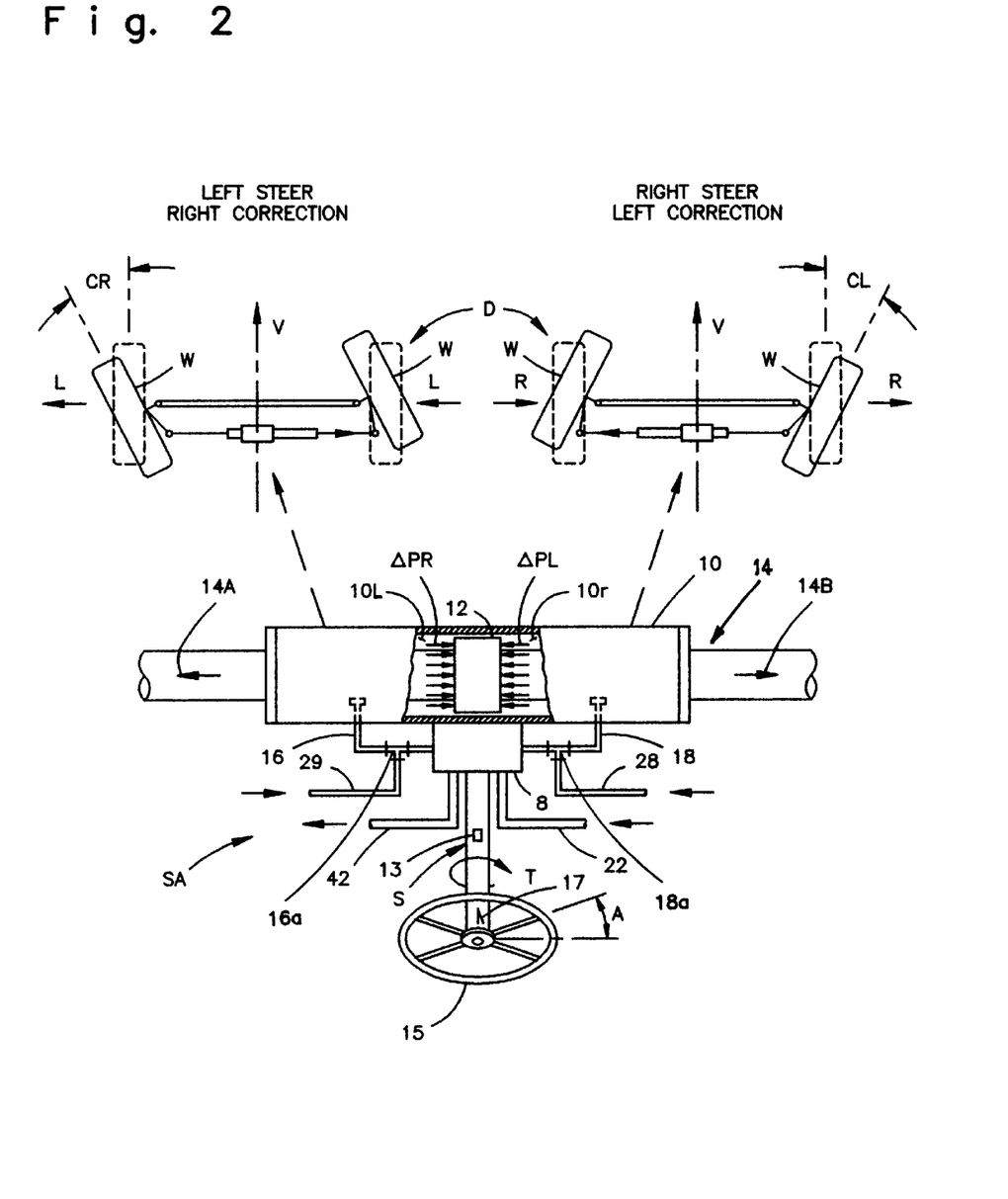
FIG. 2 is a schematic diagram showing the relationship of the power steering system and the steerable wheels of a vehicle having a rear linkage steering system.

When an operator steers the vehicle the steering assembly SA is activated by the control valve 8. Power steering fluid is pumped into a power steering cylinder 10 to one side or the other of a power steering piston 12. A left cylinder line 16 supplies the left side of the cylinder and a right cylinder line 18 supplies the right side of the cylinder. The steering piston drives a steering shaft or rack 14 to moved it to the left 14a or to the right 14b for turning the steerable wheels so that the tires of the vehicle provide lateral steering forces on the vehicle from the road surface. Left or right in this discussion refers to respective sides of the vehicle as viewed looking in the direction of travel of the vehicle having a forward velocity V (FIG. 2). Excess power steering fluid from the low pressure side of the piston is returned to the pump and reservoir by the power steering control valve 8 through return lines 42 and 40 of the power steering system. In addition, excess power steering fluid from the control valve of the steering assembly SA, not required at the time for steering, is also returned to the pump and reservoir through the return lines 40 and 42.

Power steering systems are designed to generally provide a constant fluid power supply to the steering assembly SA through the main supply line 22. A variable bypass portion of the power steering fluid depending on the output of the pump is discharged from a bypass port C of the main priority valve 4A through a main bypass line 24. The bypass line connects with the main return line 40 to return fluid to the pump and reservoir 7. The amount of fluid in the bypass line changes as the output of the pump is changed. A pressure relief valve 5 is normally provided in association with the pump and reservoir to protect the system from excess fluid pressures.

Having described the power steering system of the vehicle in detail, the discussion is further directed to the steering correction system. The components of the steering correction system are added to the vehicle's power steering system to provide the combination of this invention. The steering correction system CS diverts power steering fluid from a location 24a on the main bypass line 24 to an input port A' of a system priority valve 4B of the steering correction system, as further illustrated in FIG. 1. At least a portion of the diverted power steering fluid is for supplying an additional amount of power steering fluid to the steering assembly SA from an output port B' of the system priority valve through a correction system supply line 26. A correction system bypass line 25 is supplied from the bypass port C' of the system priority valve 4B to control the amount of diverted fluid made available for the steering assembly SA through the correction supply line 26. The correction bypass line is connected to a correction system return line 44 that connects with the main bypass line 24 at another location 44a.

When a drift or pull correction is desired, that portion of the diverted power steering fluid in the correction supply line 26 is available to be supplied to one side or the other of the power steering piston 12 within the power steering cylinder 10, as illustrated in FIG. 1. The addition of the diverted fluid portion to one side of the piston increases the pressure on that side causing the piston to move the rack or shaft 14 so that the steering forces on the vehicle are changed to provide a steering correction. The diverted fluid in the correction system supply line 26 must be directed either to the right cylinder line 18 or the left cylinder line 16 as they come from the power steering control valve 8 to the power steering cylinder 10 of the steering assembly SA. A left correction valve 2 is provided to correct for the vehicle having a pull or drift to the left during normal straight ahead driving. The left correction valve supplies fluid through a left correction or trim line 28 to a location 18a of the right cylinder line 18. A right correction valve 1 is provided to correct for the vehicle having a pull or drift to the right during normal straight ahead driving. The right correction valve supplies fluid through a right correction or trim line 29 to a location 16a of the left cylinder line 16.

Both correction valves are normally closed (N.C.) unless activated to open by the correction switch mechanism 30. Back flow preventors 1A and 2A prevent the pressures in left and right cylinder lines 16 and 18 from pressurizing the correction system during normal driving and turning operational conditions of the vehicle. In an alternate configuration, the backflow preventors can be included within the correction valves 1 and 2. The power steering system pressure relief valve 5 will limit the amount of fluid pressure within the system and protect the system against high fluid pressures. The logic controller 60 controls the correction switch mechanism and valves for deciding which correction valve should be operated, as disclosed in more detail later in this discussion.

When the drift control system is inactive, or not required due to acceptable vehicle drift or pull, the power steering system performs normally. The fluid flowing in the correction supply line 26 from the system priority flow control valve 4B is diverted back to the pump and reservoir 7 by a normally open (N.O.) system valve 3 and/or a modulating valve 5 through return lines 44, 24 and 40. The system valve is installed in a first line 43 connecting the correction supply line 26 to the correction return line 44. The modulating valve is installed in a second line 46 connecting the correction supply line 26 with the correction return line 44. Another pressure relief valve (not shown) can also be provided between the correction system supply line 26 and the correction system return line 44 to provide addition protection against excess system pressures.

When the steering correction system CS is active, the modulating valve 6 provides for controlling the amount of diverted power steering fluid that will be supplied to the steering assembly SA when one of the two correction valves 1 or 2 is open. The driver adjusts the modulating valve 6 to change the amount of drift control until satisfied. A progressive closing of the modulating valve will increase the effort of the drift control where opening the modulating valve will decrease the amount of effort by the drift control. The modulating valve can be set to allow for a variable flow rate from zero to a maximum value. The maximum flow rate value for the modulating valve provides for little or no flow to the steering assembly. This flow rate modulation can be controlled manually by an operator or automatically by the logic controller. Modulation controls the magnitude of the steering correction to be only enough to correct for the pull or drift of the vehicle as necessary or desired. The modulating valve 6 and the system valve 3 can be combined into a single modulating/system valve 63, as illustrated by the dashed lines in FIG. 1. This modulating/system valve must be operated to have a normally open position when the correction valves 1 and 2 are both closed so that the fluid flowing in the correction supply line 26 can be returned to the pump and reservoir 7.

The actual operation of the steering system of the vehicle can be visualized and described in more detail by referring to illustration of FIG. 2. This illustration depicts a vehicle with a rear steering system. Fluid enters one side or other of the steering cylinder 10 to force the piston 12 to move the rack or shaft 14 either to the left 14A or to the right 14B. Both shafts work to turn the steerable wheels W of the vehicle in one direction or the other to introduce either forces R to the right or forces L to the left at the tires on the vehicle. When the rack shaft moves so that shaft extends to the right 14B from the cylinder 10 the forces R to the right are introduce to provide a correction for the vehicle pulling and/or drifting to the left. When the shaft moves so that the shaft extends to the left 14A from the cylinder the forces L to the left are introduced to provide a correction for the vehicle pulling and/or drifting to the right.

Referring to FIG. 1, for a left correction the fluid flows from system supply line 26 through the left correction N.C. valve 2 which has been opened. The left trim line 28 is connected at the location 18a of the right cylinder line 18 supplying a right steering chamber 10r on one side (right) of the piston 12 in the cylinder 10 (FIG. 2). Providing an increased fluid pressure ΔPR in the right steering chamber of the cylinder steers the vehicle to the right to provide a correction for a vehicle drift or pull to the left. A left correction steer angle CL is associated with rotating the wheels W clockwise providing a force R to the right at the tires on the vehicle. For a right correction, the fluid flows from system supply line 26 through the right correction N.C. valve 1 which has been opened. The right trim line 29 is connected at the location 16a of the left cylinder line 16 supplying the left steering chamber 10L on the other side (left) of the piston 12 inside the cylinder 10. Providing an increased fluid pressure ΔPL in the left steering chamber of the cylinder steers the vehicle to the left to provide a correction for a vehicle drift or pull to the right. A right correction steer angle CR is associated with a rotation of the wheels W counterclockwise providing a force L to the right at the tires on the vehicle.

Figure 3:
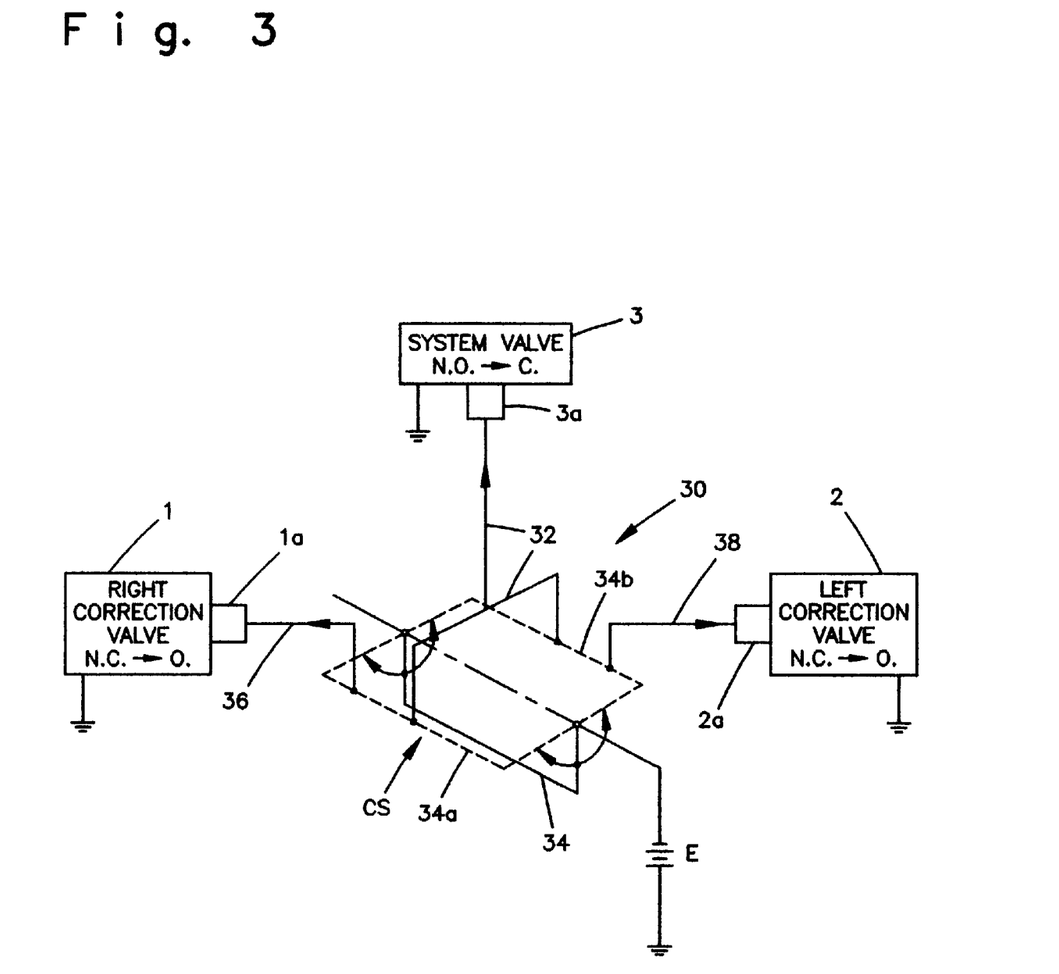
FIG. 3 is a schematic diagram illustrating the operational modes of a correction switch mechanism of the invention.

When a drift and/or a pull correction is desired by the vehicle's operator, the operator can set the switch arm 34 of the correction switch mechanism 30 in a position which closes normally open system valve 3 and opens either normally closed (N.C.) valve 1 or normally closed valve 2, as illustrated in FIG. 3. The correction switch mechanism 30 is shown in more detail in this illustration. The open control switch arm 34 allows the valves to operate in their normally open or normally closed positions. When the switch arm is in position 34a the system valve 3 is closed and right correction valve 1 is opened. When the switch arm is in position 34b the system valve is also closed and the left correction valve 2 is opened.

The correction switch mechanism 30 can also be made to operated automatically by using solenoids 3a and 1a or 2a to open or close a respective valve (FIG. 3). Electrical connection is made by switch arm 34 closing a respective circuit. When electrical power E is supplied to the switch mechanism it changes from its normal (no power) operating condition to the opposite powered condition. When the switch arm 34 is moved to the near side position 34a the cables 32 and 36 are energized to change the N.O. system switch to become closed and to change the right correction N.C. valve 1 to become open. When the switch arm is moved to the far side position 34b the cables 32 and 38 are energized to again change the N.O. system valve to become closed and change the left correction valve 2 to become open. The valves of this steering correction system are standard in the industry and are operated by standard solenoids also known in the industry.

Figure 4:
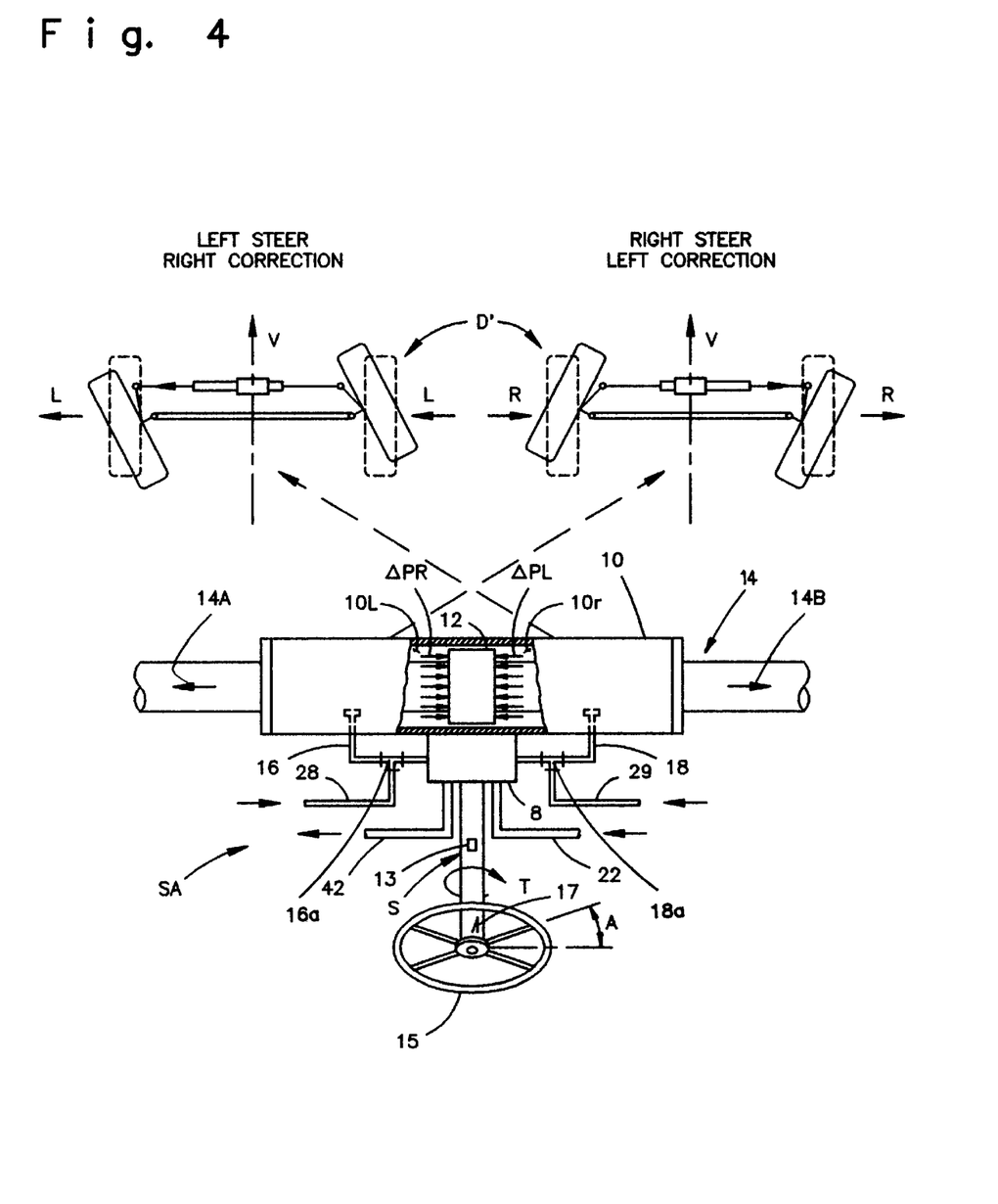
FIG. 4 is a schematic diagram showing the relationship of the power steering system and the steerable wheels of a vehicle having a front linkage steering system.

A vehicle having a front steering system is as illustrated in FIG. 4. The influence of each side of the power steering cylinder 10 is reversed. Added pressure ΔPR in the right chamber 10r of the power steering cylinder 10 steers the vehicle to the left, and added pressure ΔPL in the left chamber 10L of the power steering cylinder 10 steers the vehicle to the right. The pressure on the piston 12 operates in the same manner. However, the normally closed correction valves 1 and 2 operate with a different or opposite logic. This requires the left trim line 28 to be connected at the location 16a on the left cylinder line 16, and further requires the right trim line 29 to be connected at the location 18a on the right cylinder line 18. This simple reversal of the correction line connections provides the drift control system for a vehicle with the front steering system.

Figure 5:
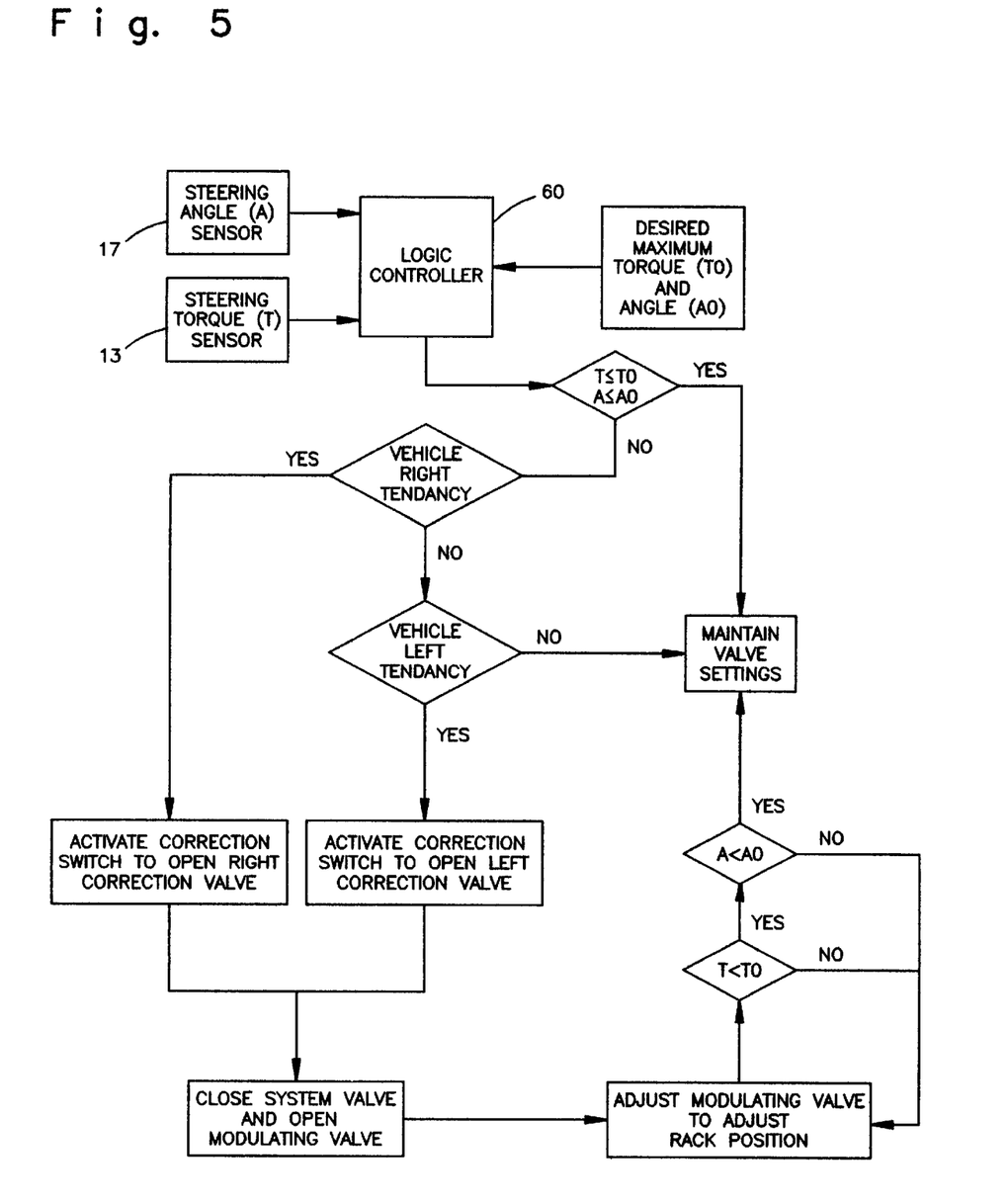
FIG. 5 is logic flow diagram showing the operating decisions in providing drift control of a vehicle according to the invention.

The correction system can be operated manually or modified to operate automatically. Both manual and automatic operations are described by referring to a flow and logic diagram, as illustrated in FIG. 5. The operator of the vehicle can visually sense the steering wheel angle A and feel the amount of torque T being applied to the steering shaft or perceive an undesirable vehicle trajectory. The magnitude of these parameters can be evaluated by the operator. Logical decisions can be made by the operator if these values appear to be too large. Alternately, electromechanical sensors can be placed on the steering shaft and the steering wheel to provide signals which are processed electrically within a circuit of a logic controller. Electrical signals can be generated for automatic operation of the steering correction system by a steering angle sensor 17 and/or a steering torque sensor 13. Both sensors types are known in the industry. Controlling the respective valves of the correction system is associated with making the correct decisions and taking appropriate action; either manually by the operator or electrically by using sensors and electromechanical components. Electrical components and logic circuits within the logic controller can automatically generate electrical signals to operate the valves using solenoids. The logic controller can be a person or electrical components.

The logic controller processes torque T and/or angle A information from the steering column S or steering wheel 15 (FIGS. 2 and 4) and periodically adjusts the valves of the steering correction system CS so that the desired torque TO and/or angular values AO are obtained. A logic circuit decision is made to see if valve setting are to be maintained by comparing the torque T with the desired torque TO and the steering wheel angle A with the desired angle AO. If actual values are less than the desired values the existing valve settings are maintained. If actual values are larger than desired, the drift and/or pull on the vehicle is evaluated to determine if there is a tendency for the vehicle to move left or right during straight ahead driving. Electrically the angle A and the torque T can have either plus (+) or minus (−) values with a computed value for each.

If there is a right drift or pull tenancy the correction switch 30 is activated to open the right correction valve 1 and the system valve 3 is closed, as shown in the flow diagram of FIG. 5. If there is a left drift or pull tenancy the correction switch is activated to open the left correction valve and close the system valve. The modulating valve is also opened with the activation of either the left or the right correction valve. The modulating valve is adjusted to a provide a new position of the rack 14 within the steering assembly SA. The greater the modulating valve is opened the greater the change in the steer angle CL or CR of the wheels. Therefore, the greater the wheel angle becomes the greater the drift and pull correction forces become (FIGS. 2 and 4). Changing the lateral forces R or L on the wheels changes the actual steering wheel angle A and steering shaft torque T necessary to provide straight ahead travel of the vehicle. If the resulting correction has provided new angle and torque values which are within the desired values for angle AO and torque TO, the valve settings can be maintained. That is, if T<TO and A<AO, the correction system has satisfied the operator's demands and the drift and/or pull has been corrected. The vehicle will travel ahead with little or no angle and torque for improved on-center feel by the operator while driving the vehicle.

One embodiment of this system has been described. Other embodiments can perform the same function such as, but not limited to, integrating valves 1, 2, 3, 4B, and 6 into the power steering control valve 8 and/or removing the system priority flow control valve 4B (FIG. 1).

The present invention requires only the addition of fluid lines and associated plumbing to the existing steering system without the addition of cylinders or other major components. The embodiments of the present invention can be a modification of the existing conventional hydraulic power steering system. The systems best adapted for the present system of this invention utilize a power rack and pinion steering gear. However, it is also applicable to a power worm and sector gear.

From the above discussion of the preferred embodiment of the invention, those skilled in the art will perceive other improvements, changes and modifications within the skill of those in the are which are essentially covered by the appended claims.

What is claimed is:

1. A steering correction system for an existing hydraulic power steering system of a vehicle for assisting an operator in controlling straight ahead travel of said vehicle, said power steering system having a hydraulic pump and reservoir with a pressure relief valve, a main priority valve, a main bypass line and a main supply line and return lines for supplying and returning a hydraulic fluid to a power steer assembly mounted on a frame of said vehicle so that said assembly provides steering forces for wheels of said vehicle, said power steering assembly having a control valve, a power steering cylinder and cylinder lines extending between said control valve and said power steering cylinder, said correction system comprising:

a plurality of correction lines including a correction supply line and a correction return line connected to said main bypass line of said power steering system for diverting and selectively routing a portion of said hydraulic fluid within said power steering system to said cylinder lines of said steering assembly;

a system priority valve for receiving said fluid portion from said main bypass line and dividing said hydraulic fluid portion to provide flow into said correction supply line and said correction return line of said plurality of correction lines;

a system valve located in a first line between said correction supply line and said correction return line for selectively routing an adjustable first part of said hydraulic fluid portion to flow from said correction supply line into said correction return line of said plurality of correction lines;

a modulating valve located in a second line between said correction supply line and said correction return line for selectively routing an adjustable second part of said fluid portion to said correction return line from said correction supply line;

said correction supply line being further divided into a left trim line and a right trim line;

a pair of correction valves each located in a respective trim line for routing a third part of said hydraulic fluid portion through a respective trim line to a respective cylinder line of said steering assembly when said correction valve is activated; and     a logic controller and a switch mechanism for operating and activating each one of said correction system valves to provide a relative magnitude of said fluid portions, wherein said wheels are rotated for adjusting and steering forces on said vehicle and wherein operator supplied steering forces are reduced during said straight ahead driving of said vehicle.

2. The system set forth in claim 1 wherein said pair of correction valves include:

a left correction valve activated by said logic controller during a left correction demand for supplying said third part of said hydraulic fluid portion to said steering assembly through said left trim line; and     a right correction valve activated by said logic controller during a right correction demand for supplying said third part of said hydraulic fluid portion to said steering assembly through said right trim line.

3. The system set forth in claim 2 including a pair of backflow preventors being one installed in said left trim line and another installed in said right trim line, wherein power steering fluid of said steering assembly will not pressurize said steering correction system.

4. The system set forth in claim 1 including a pressure relief valve connected between said correction supply line and said correction return line for providing protection against excessive fluid pressures in said correction supply line.

5. The system set forth in claim 1 wherein said modulating valve is hand activated and operated for providing means for said operator to manually adjust the steering correction system based on logic provided by the operator during straight ahead running of the vehicle, wherein the operation of said logic controller is partially provided by the operator of said vehicle.

6. The system set forth in claim 1 including:
a steering angle sensor for sensing a rotational angle of a steering wheel of said vehicle and for generating a angle signal to be used by said logic controller; and
a steering torque sensor for sensing a torque on said steering column of said vehicle and for generating a torque signal to be transmitted to said logic controller.

7. The system set forth in claim 6 wherein said system valve, said modulating valve and said pair of correction valves are automatically operated by said logic controller based on logic provided by electronic components and logic circuits within said logic controller, wherein said straight ahead travel of the vehicle is automatically controlled.

8. The system set forth in claim 1 wherein said modulating valve is a variable flow valve which can be set by said logic controller to provide said adjustable third part of said fluid portion.

9. The system set forth in claim 1 wherein said system valve and said modulating valve are combined into a single system/modulating valve for performing the same functions as the system valve and the modulating valve provide individually.

10. A steering correction system in combination with a motor vehicle's power steering system for correcting steering drift and pull on said vehicle so that said vehicle travels a straight ahead path without operator assistance, said vehicle having a conventional power steering system including a hydraulic pump and reservoir connected to a steering assembly which is displaced to apply a lateral force on at least one steerable wheel of said vehicle, said system comprising:
a plurality of main lines for connecting said hydraulic pump and reservoir with said steering assembly and including a main bypass line;
a plurality of correction lines connected between said bypass line and cylinder lines of said steering assembly for selectively routing a portion of said steering fluid within said steering system without the need for additional fluids added to said power steering system;
a plurality of correction valves including backflow preventors selectively located in said correction lines for providing said connection without the use of other mechanical components added to and modifying said conventional power steering system; and
a logic controller and a switch mechanism for electrically operating at least one of said plurality of valves based on a desired steering correction to said steering pull, wherein said steering pull and drift is compensated without continuous steering inputs by said operator.

11. The system set forth in claim 10 including:
a left correction valve of said plurality of correction valves to be activated by said logic controller and switch mechanism in response to a left correction demand for supplying a part of said steering fluid portion to a right cylinder line of said steering assembly through a left trim line of said plurality of correction lines; and
a right correction valve of said plurality of correction valves to be activated by said logic controller and switch mechanism in response to a right correction demand for supplying said part of said steering fluid portion to a left cylinder line of said steering assembly through a right trim line.

12. The system set forth in claim 11 including:
a system priority valve of said plurality of valves for selectively dividing said steering fluid and supplying said portion of said steering fluid to a correction supply line of said plurality of correction lines;
a system valve of said plurality of valves for returning said portion of said steering fluid directly to said power steering system through a first line when no correction is required; and
a modulating valve of said plurality of valves installed in a second line of said plurality of correction lines for modulating the amount of said portion of said steering fluid which is available to said left and right correction valves for said correcting of drift and pull on the vehicle.

13. The system set forth in claim 10 including:
a steering angle sensor for sensing a rotational angle of a steering wheel of said vehicle and for generating a angle signal to be used by said logic controller; and
a steering torque sensor for sensing a torque on said steering column of said vehicle and for generating a torque signal to be transmitted to said logic controller.

14. The system set forth in claim 13 wherein said plurality of valves and are automatically operated by said logic controller based on logic provided by electronic components and logic circuits within said logic controller, wherein said straight ahead travel of the vehicle is automatically controlled.

15. The system set forth in claim 10 including a steering angle sensor for sensing a rotational angle of a steering wheel of said vehicle and for generating a angle signal to be used by said logic controller, wherein said plurality of valves are automatically operated by said logic controller based on logic provided by electronic components and logic circuits within said logic controller and wherein said straight ahead travel of the vehicle is automatically controlled.

16. The system set forth in claim 10 including a steering torque sensor for sensing a torque on said steering column of said vehicle and for generating a torque signal to be transmitted to said logic controller, wherein said plurality of valves are automatically operated by said logic controller based on logic provided by electronic components and logic circuits within said logic controller, wherein said straight ahead travel of the vehicle is automatically controlled.

* * * * *